US012604804B2

(12) United States Patent     (10) Patent No.:   US 12,604,804 B2

Jung et al.     (45) Date of Patent:    Apr. 21, 2026

(54) CLEANING ASSEMBLY FOR A COMBINE HARVESTER

(71) Applicant: DEERE & COMPANY, Moline, IL (US)

(72) Inventors: Daniel Jung, Saarbrücken (DE); Martin Rittershofer, Zweibrücken (DE); Kevin P. Hurley, East Moline, IL (US); Yogesh Chande, Bettendorf, IA (US); Michael Tupper, Bettendorf, IA (US)

(73) Assignee: Deere & Company, Moline, IL (US)

( * ) Notice: Subject to any disclaimer, the term of this patent is extended or adjusted under 35 U.S.C. 154(b) by 412 days.

(21) Appl. No.: 18/219,782

(22) Filed: Jul. 10, 2023

(65)     Prior Publication Data

US 2024/0023483 A1    Jan. 25, 2024

(30)     Foreign Application Priority Data

Jul. 22, 2022    (DE) .......................... 102022118393.9

(51) Int. Cl.
   *A01D 41/127*      (2006.01)
   *A01F 12/44*      (2006.01)
(52) U.S. Cl.
   CPC ..... *A01D 41/1274* (2013.01); *A01D 41/1276* (2013.01)
(58) Field of Classification Search
   CPC .............. A01D 41/127; A01D 41/1274; A01D 41/1276; A01D 75/282; A01F 12/46;

(Continued)

(56)     References Cited

U.S. PATENT DOCUMENTS 3,108,064 A   *   10/1963   Grant ................... A01D 75/282
                                            209/261
3,581,746 A      6/1971   Louks
                   (Continued)

FOREIGN PATENT DOCUMENTS

DE       2454315 A1    5/1976
DE       2830103 A1    1/1980
                   (Continued)

OTHER PUBLICATIONS

Extended European Search Report and Written Opinion issued in European Patent Application No. 23178354.9, dated Jan. 4, 2024, in 08 pages.

*Primary Examiner* — Joseph M Rocca
*Assistant Examiner* — Robert E Pezzuto
(74) *Attorney, Agent, or Firm* — Taft Stettinius & Hollister LLP; Stephen F. Rost

(57)         ABSTRACT

A cleaning assembly for a combine harvester. The cleaning assembly includes a conveyor for transporting at least one of or both of a threshed or separated mixture of grain and contaminants from at least one of or both of a threshing or separating device to an inlet of the cleaning assembly, screens for cleaning the mixture fed to the inlet of the cleaning assembly, which are able to be subjected to the action of an air flow by a fan, and a cross conveyor, arranged at the inlet of the cleaning assembly, for evening out the lateral distribution of the fed mixture. The cross conveyor is implemented with an open, air-permeable design and is arranged in an air flow provided by the fan.

20 Claims, 5 Drawing Sheets

(58) Field of Classification Search
CPC ...... A01F 12/44; A01F 12/444; A01F 12/446;
B65G 17/32; B65G 19/10; B65G 19/24
See application file for complete search history.

(56) References Cited

U.S. PATENT DOCUMENTS

| 5,338,257 | A | 8/1994 | Underwood | |
|---|---|---|---|---|
| 8,347,709 | B2 * | 1/2013 | Kormann | G01F 9/003 |
| | | | | 73/861.73 |
| 10,791,677 | B2 * | 10/2020 | Puryk | A01D 75/282 |
| 2017/0099777 | A1 | 4/2017 | Weeks et al. | |
| 2021/0237978 | A1 * | 8/2021 | Isaac | B65G 17/32 |

FOREIGN PATENT DOCUMENTS

| DE | 102008017671 | A1 | 10/2009 |
|---|---|---|---|
| EP | 1769669 | A1 | 4/2007 |
| EP | 2425702 | A1 | 1/2015 |
| EP | 3501259 | A1 | 6/2019 |
| GB | 922907 | A | 4/1963 |

* cited by examiner

CLEANING ASSEMBLY FOR A COMBINE HARVESTER

RELATED APPLICATION

This application claims priority to DE 10 2022 118 393.9, filed Jul. 22, 2022, which is hereby incorporated by reference herein in its entirety.

FIELD OF THE DISCLOSURE

The present disclosure relates generally to a combine harvester and more particularly to a cleaning assembly for a combine harvester.

BACKGROUND

Combine harvesters serve to harvest grain. The parts of plants, such as soya, wheat or oats, which are above the ground are cut off or picked up or stripped off, or the fruits of the plants, such as corn or sunflowers, are separated off and fed to a threshing and separating device in order to separate the grain from the remaining constituent parts of the crop. After the threshing and separating operation, there are still contaminants in the grain, such as particles of straw and chaff. The mixture of grain and contaminants obtained during the threshing and separation is therefore fed via conveying devices to a cleaner which generally comprises an upper screen and a lower screen and optionally a preliminary screen. A fan subjects the screens to the action of an air flow from below. In addition, the screens are set into oscillating reciprocating motion in which they move back and forth and up and down on elliptical or circular paths.

Since the action of the cleaner is based at least partially on the action of gravity and depends on the material thickness of the mixture on the screens, such that a usable result is best achievable when the crop is distributed evenly across the width of the screens, different arrangements have been proposed (in addition to screens vibrating back and forth in a lateral direction, which are intended to even out the material distribution on the screen), which serve to distribute the crop as evenly as possible at the inlet of the cleaner.

Thus, GB 922 907 A describes a screw conveyor arranged upstream of the dispensing end of the conveyor floor (conveying the mixture dispensed from the threshing drum rearwardly to the cleaner) in order to convey the crop if necessary, for example when traveling on a slope, to the left or right (up the slope) in order to supply the cleaner with crop as evenly as possible across its width. Similar arrangements having screw conveyors at the dispensing end of a conveyor floor that conveys the crop forwardly from the separator to the cleaner can be found in U.S. Pat. No. 3,581,746 A, EP 2 425 702 A1 and EP 3 501 259 A1. For this purpose, conveyor belts arranged at said point for cross-conveying the crop have also been proposed (DE 24 54 315 A1, EP 2 425 702 A1). A further approach (U.S. Pat. No. 5,338,257 A) consists in arranging, at the front end of a screen, a chain circulating about two sprockets with horizontal axes extending in the forward direction, to which chain a number of fingers that project toward the rear, over the front region of the screen are fastened. Depending on the lateral inclination of the combine harvester, the chain is set in motion toward the left or right, wherein the fingers of the upper strand move up the slope. The screen is subjected to the action of air from below.

SUMMARY

In light of the foregoing, it is apparent that the previous cross conveyors are arranged outside the air flow provided by the fan. They provide a certain conveying action for the mixture in a lateral direction, which is based solely on the mechanical action.

In one or more implementations, the present disclosure provides an improved action of a cleaner.

A cleaning assembly for a combine harvester includes a conveyor for transporting at least one of or both of a threshed or separated mixture of grain and contaminants from at least one of or both of a threshing or separating device to an inlet of the cleaning assembly, screens for cleaning the mixture fed to the inlet of the cleaning assembly, which are able to be subjected to the action of an air flow by a fan, and a cross conveyor, arranged at the inlet of the cleaning assembly, for evening out the lateral distribution of the fed mixture. The cross conveyor is implemented with an open, air-permeable design and is arranged in an air flow provided by the fan.

The air-permeable cross conveyor is arranged in the air flow provided by the fan, this having the advantage that devices arranged to the rear of the cross conveyor, such as at least one of or both of slats or finger rakes, can also be subjected to the action of the air flow in order to already achieve an air-flow-based separation of the mixture into grain and contaminants in the region of the inlet of the cleaning assembly. As a result of the open design, the cross conveyor also brings about, in a mechanical manner and by way of the air flow flowing through the mixture lying on its top side, loosening and separation of the mixture. Mixture passing through the gaps in the cross conveyor is separated further by the air flow. In this way, the action of the cleaning assembly is improved.

In one implementation, there is provided a cleaning assembly for a combine harvester. The combine harvester includes a conveyor for transporting at least one of or both of a threshed or separated mixture of grain and contaminants from at least one of or both of a threshing or separating device to an inlet of the cleaning assembly. Screens for cleaning the mixture fed to the inlet of the cleaning assembly are subjected to the action of an air flow by a fan. A cross conveyor is arranged at the inlet of the cleaning assembly for evening out the lateral distribution of the fed mixture, wherein the cross conveyor includes an open, air-permeable design, being arranged in an air flow provided by the fan.

In some implementations, the cleaning assembly includes wherein the cross conveyor includes an endless traction means having drivers distributed in a spaced-apart manner along a length of the traction means, wherein the traction means circulates about deflection wheels.

In some implementations, the cleaning assembly includes wherein the cross conveyor includes a plurality of successively arranged traction means and the drivers are each connected to the plurality of traction means.

In some implementations, the cleaning assembly includes wherein the drivers have a U-shaped profile which is upwardly open when a respective driver to one of the plurality of traction means is located on an upper strand of the cross conveyor.

In some implementations, the cleaning assembly includes wherein the drivers of at least one of or both of a lower or an upper strand of the cross conveyor are supported on support elements which extend in a lateral direction.

In some implementations, the cleaning assembly includes wherein the air flow flows against and through the cross conveyor substantially horizontally.

In some implementations, the cleaning assembly includes wherein a number of slats is arranged to a rear of the cross conveyor, which are able to be flowed through by the air flow that has previously flowed through the cross conveyor.

In some implementations, the cleaning assembly includes wherein a finger rake is arranged to a rear of the number of slats, which is able to be flowed through by the air flow that has previously flowed through the cross conveyor.

In some implementations, the cleaning assembly includes wherein a conveyor floor is mounted upstream of the cross conveyor, wherein a conveyor dispenses mixture from the threshing device onto the conveyor floor via a drop step.

In some implementations, the cleaning assembly includes wherein a further conveyor is arranged beneath the cross conveyor and the slats, the further conveyor conveying the material dropping onto the further conveyor toward the rear and dispensing the material onto a front region of a lower screen via a further drop step.

In some implementations, the cleaning assembly includes wherein a lower strand of the cross conveyor is arranged at a height above the further conveyor that is measured such that the lower strand does not appreciably convey material located on the further conveyor to a side.

In some implementations, the cleaning assembly includes wherein the cross conveyor is able to be set into a vibrating motion, in particular together with at least one of, some of, or all of: 1) the slats; 2) the finger rake; 3) the conveyor floor; or 4) a further conveyor floor.

In some implementations, the cleaning assembly includes wherein a planar separating element is fitted in a central plane of the cross conveyor in order to prevent material from dropping through the upper strand of the cross conveyor onto the lower strand and being conveyed in an undesired direction.

In some implementations, the cleaning assembly includes wherein the direction and speed of rotation of a drive, in particular of a motor, of the cross conveyor is able to be predefined, on the basis of at least one of, some of, or all of: 1) a lateral inclination, sensed by a sensor, of the combine harvester; 2) a distribution, sensed by a sensor, of the material across the width of the cleaning assembly; or 3) an operator input via a suitable interface.

In a further implementation, there is provided a combine harvester for harvesting crop. The combine harvester includes a threshing unit configured to thresh the crop and a cleaning assembly. The cleaning assembly is configured to clean the threshed crop, wherein the cleaning assembly includes a conveyor for transporting at least one of or both of a threshed or separated mixture of grain and contaminants from at least one of or both of a threshing or separating device to an inlet of the cleaning assembly. Screens for cleaning the mixture fed to the inlet of the cleaning assembly are subjected to the action of an air flow by a fan. A cross conveyor is arranged at the inlet of the cleaning assembly for evening out the lateral distribution of the fed mixture, wherein the cross conveyor includes an open, air-permeable design, being arranged in an air flow provided by the fan.

In some implementations, the combine harvester includes wherein the cross conveyor includes an endless traction means having drivers distributed in a spaced-apart manner along a length of the traction means, wherein the traction means circulates about deflection wheels.

In some implementations, the combine harvester includes wherein the cross conveyor includes a plurality of successively arranged traction means and the drivers are each connected to the plurality of traction means.

In some implementations, the combine harvester includes wherein the drivers have a U-shaped profile which is upwardly open when a respective driver to one of the plurality of traction means is located on an upper strand of the cross conveyor.

In some implementations, the combine harvester includes wherein the drivers of at least one of or both of a lower or an upper strand of the cross conveyor are supported on support elements which extend in a lateral direction.

In some implementations, the combine harvester includes wherein the air flow flows against and through the cross conveyor substantially horizontally and a number of slats are arranged to a rear of the cross conveyor, which are able to be flowed through by the air flow that has previously flowed through the cross conveyor.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein:.

DETAILED DESCRIPTION

Figure 1:
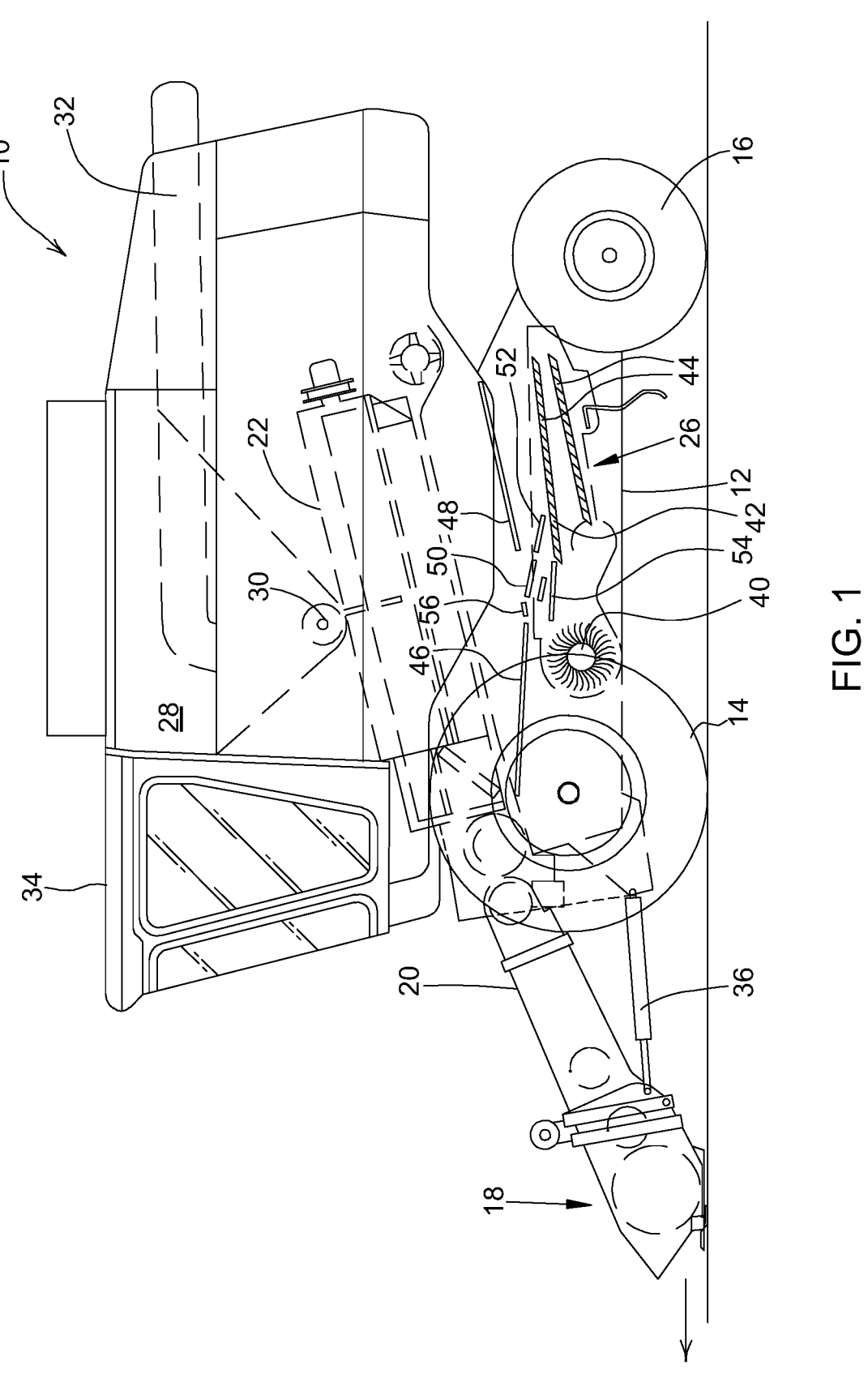
FIG. 1 shows a schematic side view of a combine harvester.

FIG. 1 shows a self-propelled harvesting machine in the form of a combine harvester 10 having a chassis 12 which is supported on the ground via driven front wheels 14 and steerable rear wheels 16 and is moved by said wheels. The wheels 14, 16 are set in rotation by means of drive means that are not shown, in order to move the combine harvester 10 for example over a field to be harvested. In the following text, direction indications, such as front and rear, relate to the direction of travel V, running to the left in FIG. 1, of the combine harvester 10 in harvesting operation.

A harvesting header 18 in the form of a cutting unit is removably attached to the front end region of the combine harvester 10 in order, in a harvesting operation, to harvest crop in the form of cereal or other threshable cereal crops from the field and to feed the crop upwardly and rearwardly through a feeder house assembly 20 to an axial threshing unit 22. The mixture passing through threshing concaves and gratings in the axial threshing unit 22 and containing grains and contaminants passes into a cleaning assembly 26. Cereal cleaned by the cleaning assembly 26 is fed by means of a grain screw to a grain elevator which delivers it into a grain tank 28. The cleaned cereal from the grain tank 28 can be discharged through a discharge system with a transverse screw 30 and a discharge conveyor 32. The abovementioned systems are driven by means of a combustion engine and are monitored and controlled by an operator from a driver's cab 34. The axial threshing unit 22 is only one exemplary implementation and could be replaced by a tangential threshing unit having successive separating devices in the form of at least one of, some of, or all of: separator drums, straw walkers, or axial separating rotors.

The cleaning assembly 26 comprises, in a manner known per se, an upper screen 42 and a lower screen 44 which are subjected, by a fan 40, to the action of an air flow flowing rearwardly and upwardly through the screens 42, 44. The size of the screen openings and the rotational speed of the fan 40 may be varied in a manner known per se by an automatic cleaning setting or by the operator from the driver's cab 34.

The mixture of grain and contaminants released (threshed) from the crop in the front region of the axial threshing unit 22 is conveyed rearwardly by a front conveyor 46 which thus serves to convey the threshed mixture. A rear conveyor 48 conveys the mixture separated in the rear region of the axial threshing unit 22 forward.

Provided at the dispensing end of the front conveyor 46 is a conveyor floor 56, which is followed toward the rear by a cross conveyor 50. Provided to the rear of the cross conveyor 50 are a number of successively arranged slats 52 that extend per se transversely and obliquely upwardly and rearwardly. Located beneath the cross conveyor 50 is a further conveyor floor 54.

Reference is now made to FIGS. 2 to 5. It is apparent therefrom that the front conveyor 46 comprises a number of conveyor screws 63 that extend in the forward direction V and are arranged laterally next to one another. The conveyor floor 56 that follows immediately downstream is arranged beneath the rear end of the front conveyor 46 and offset forwardly with its front end with respect thereto. The conveyor floor 56 is equipped with transversely extending sawtooth profiles. Arranged on the top side of the conveyor floor 56 are separating plates 80 which extend vertically and in the forward direction V and are each positioned in a lateral direction centrally between two conveyor screws 63 of the front conveyor 46. They are intended to prevent the mixture moving laterally on the conveyor floor 56, in particular when traveling on a slope.

Figure 2:
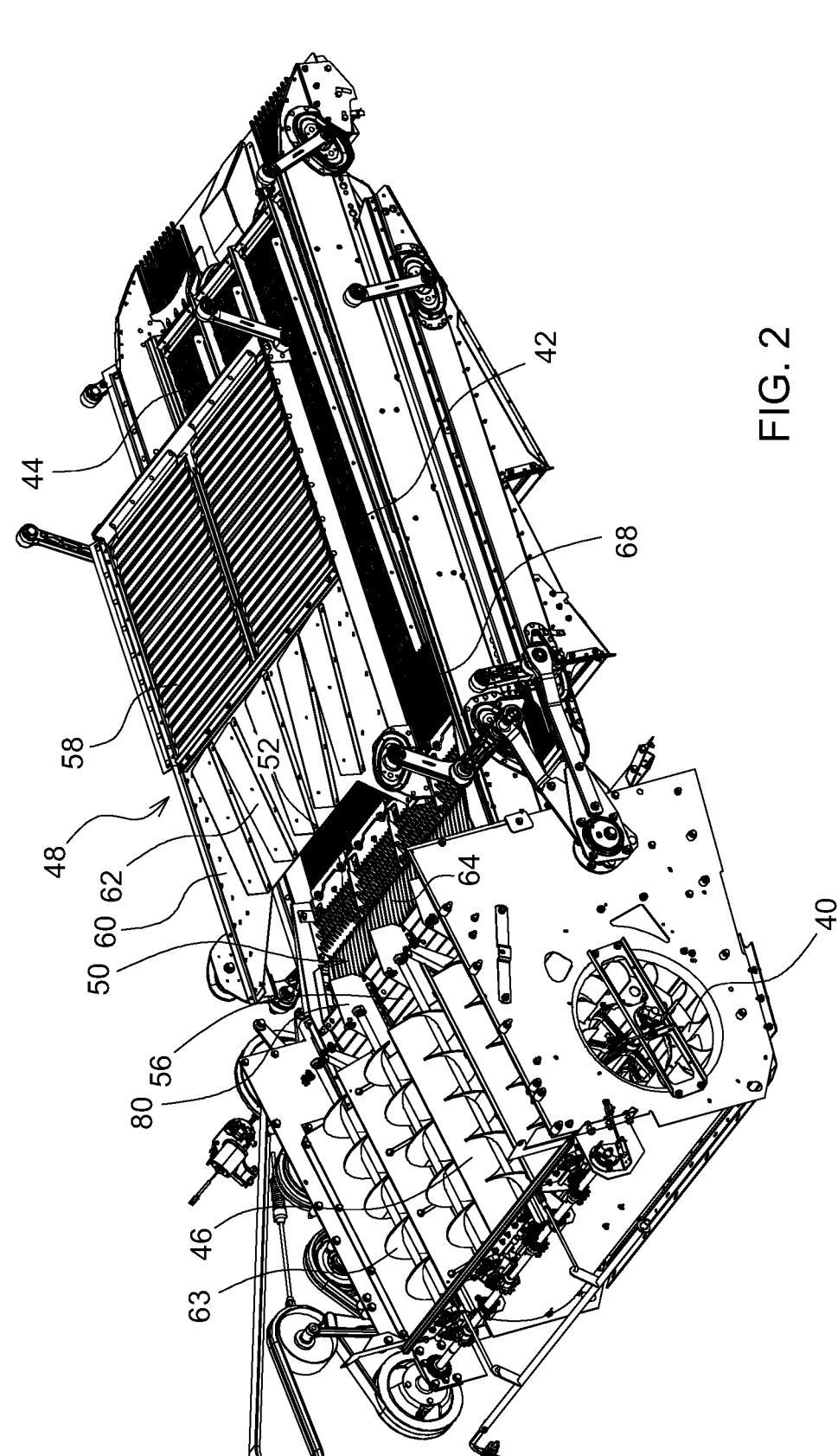
FIG. 2 shows a perspective view of the cleaning assembly of the combine harvester in FIG. 1 from front left and above.

The rear conveyor 48 comprises a rear region with transversely extending sawtooth profiles 58 and a smooth front region 60 with vertically extending guide plates 62, which laterally bring together the separated mixture. This passes, as is apparent from FIG. 3, onto the cross conveyor 50. As shown in FIG. 2, the front region 60 is provided centrally at its front end with a cutout. The separated mixture is accordingly passed onto the cross conveyor 50 mostly in the middle thereof. During operation, the rear conveyor 48 is set into a back and forth and up and down oscillating motion, this being the case analogously for the screens 42, 44. To this end, the rear conveyor 48 can be mounted on rockers and be set into said motion via an eccentric drive. Depending on the position of the rear conveyor 48 and on the lateral position of the dispensing of material, the crop dispensed by the rear conveyor passes onto at least one of or both of the cross conveyor 50 or onto the slats 52.

The conveyor floor 56, the cross conveyor 50 and, to a certain extent, also the slats 52 accordingly form an inlet of the cleaning assembly 26.

Provided beneath the cross conveyor 50 is the further conveyor floor 54, which is equipped with transversely extending sawtooth profiles. The cross conveyor 50 forms, with the conveyor floor 56, the slats 52 and rearwardly extending finger rakes 68 fitted behind the slats 52, an assembly which is able to be set jointly into oscillating motion, i.e. moves continuously back and forth and up and down, analogously to the rear conveyor 48.

An upper outlet 74, defined between an upper outlet wall 78 and a lower outlet wall 76, of the fan 40 opens out beneath the conveyor floor 56. A lower outlet 94 of the fan 40 is directed at the screens 42, 44.

The cross conveyor 50 comprises a number of drivers 64 that extend in the forward direction V and each extend between two endless, internally toothed traction means 84, which, as shown here, are implemented as belts, but could also be implemented as chains. The drivers 64 are implemented as U-shaped profiles, which are fastened, for example screwed, with their bases to the traction means 84. At their front and rear ends, the drivers 64 are beveled. The two traction means 84 each circulate about two front deflection wheels 70 and two rear deflection wheels 72, respectively. For their part, the deflection wheels 70, 72 are mounted rotatably on mounts 90, which for their part are fastened to a supporting frame of the abovementioned assembly of the cross conveyor 50, conveyor floor 56 and slats 52. The two traction means 84 may be tensioned by suitable means (for example at least one of or both of springs or adjustable attachment to the mounts 90).

A drive arrangement having a motor 92, a shaft 88 coupled thereto and meshing bevel gears 85, 86 serves to drive the deflection wheels 70, 72 arranged on one side, which for their part set the traction means 84 in motion in turn in at least one of or both of a form or force-fitting manner. The motor 92 may be driven electrically or hydraulically and be connected via flexible lines, guided in a loop, to a drive energy source fitted on the chassis 12. The associated lines on the chassis may be guided in particular in the cavity formed to the rear of the outlet wall 76. Rather than a motor 92, it is also possible to use a variable-speed and variable-direction (mechanical) drive train which connects the shaft 88 to the combustion engine.

Support elements 96 that extend across the width of the cross conveyor 50 and bear at the bottom on the drivers 64 in front of or behind the upper strand of the traction means 84 serve to support the traction means 84 and prevent them from sagging or being set into a vertical vibrating motion. A further support element 96 is located centrally beneath the middle of the drivers 64 of the lower strand of the cross conveyor 50.

On the basis of a least one of, some of, or all of 1) the lateral inclination, sensed by a sensor, of the combine harvester 10, 2) a distribution, sensed by a sensor, of the material across the width of the cleaning assembly 26, or 3) an operator input via a suitable interface, during harvesting operation, the direction and speed of rotation of the motor 92 of the cross conveyor are set automatically in a manner known per se (cf. U.S. Pat. Nos. 3,581,746 A, 5,338,257 A, EP 3 501 259 A1), in order to even out the distribution of the crop at the inlet of the cleaning assembly 26. The upper strand of the cross conveyor 50 is driven in each case such that it moves toward the side directed up the slope or toward that side at which less mixture is present.

In light of the foregoing, the following function of the cleaning assembly 26 results.

The threshed mixture dispensed by the front conveyor 46 at its rear dispensing end drops via a drop step onto the conveyor floor 56 and is conveyed by the latter to the rear, where it passes onto the upper strand of the cross conveyor 50. The separated mixture dispensed forwardly by the rear conveyor 48 also arrives there.

The cross conveyor 50 is subjected from the front and below to the action of an air flow through the outlet 74 of the fan, said air flow flowing toward the rear between the underside of the conveyor floor 56 and the top side of the further conveyor floor 54. On account of its open design with the drivers 64 suspended on endless traction means 84, in contrast to a screw conveyor or a conveyor belt, the cross conveyor 50 is permeable (to air) both in a horizontal direction and in a vertical direction. As a result, the air flow entering from the outlet 74 can flow through the mixture lying on the upper strand and blow relatively light contaminants off the latter toward the rear, and, moreover, grain from the mixture conveyed above the upper strand of the cross conveyor 50 can drop down between the drivers 64.

From the top side of the upper strand of the cross conveyor 50, the mixture passes, as a result of the vibrating motion and the air flow, onto the slats 52 located therebehind and the finger rakes 68. The slats 52 are likewise flowed through from below by the air flow from the fan 40 and a certain separating action takes place there too for the mixture lying thereon, this also being the case analogously for the finger rakes 68. The mixture passes from the finger rakes 68 onto the upper screen 44.

The grain and other constituents of the mixture that drop down through the cross conveyor 50 and between the slats 52 pass onto the further conveyor floor 54. This transports them rearwardly to its rear dispensing end, at which they drop down onto a drop step and pass onto the lower screen 42. This drop step is subjected to the action of an air flow through the lower outlet 94 of the fan 40, said air flow blowing relatively light contaminants away toward the rear.

In the case of laterally uneven material distribution in the cleaning assembly 26, which can be sensed at any point therein by at least one of, some of, or all of: 1) a sensor (not shown), 2) when traveling on a slope, the angle of which can be detected by a different sensor (not shown), or 3) in response to a corresponding operator input via a suitable interface in the cab 30, the cross conveyor 50 is set in operation by the motor 92. The upper strand of the cross conveyor 50 moves the threshed or separated, incoming mixture to that side at which there is less material. In the process, on account of the open design with endless traction means 84 and drivers 64, material is dispensed little by little across the entire width of the cross conveyor 50.

The lower strand of the cross conveyor 50 moves in this case in the opposite direction, and so there is, in principle, the risk of it conveying material in the wrong direction. For this reason, the height of the lower strand above the further conveyor floor 54 is selected such that the material located on the further conveyor floor 54 is located beneath the lower strand of the cross conveyor 50 in normal operation. Material dropping from above onto the drivers 64 of the lower strand will, on account of the smooth faces of the drivers 64 on their sides adjacent to the endless traction means 84, drop off therefrom and will not be carried along in the wrong direction, or at least not to a disruptive extent.

Figure 3:
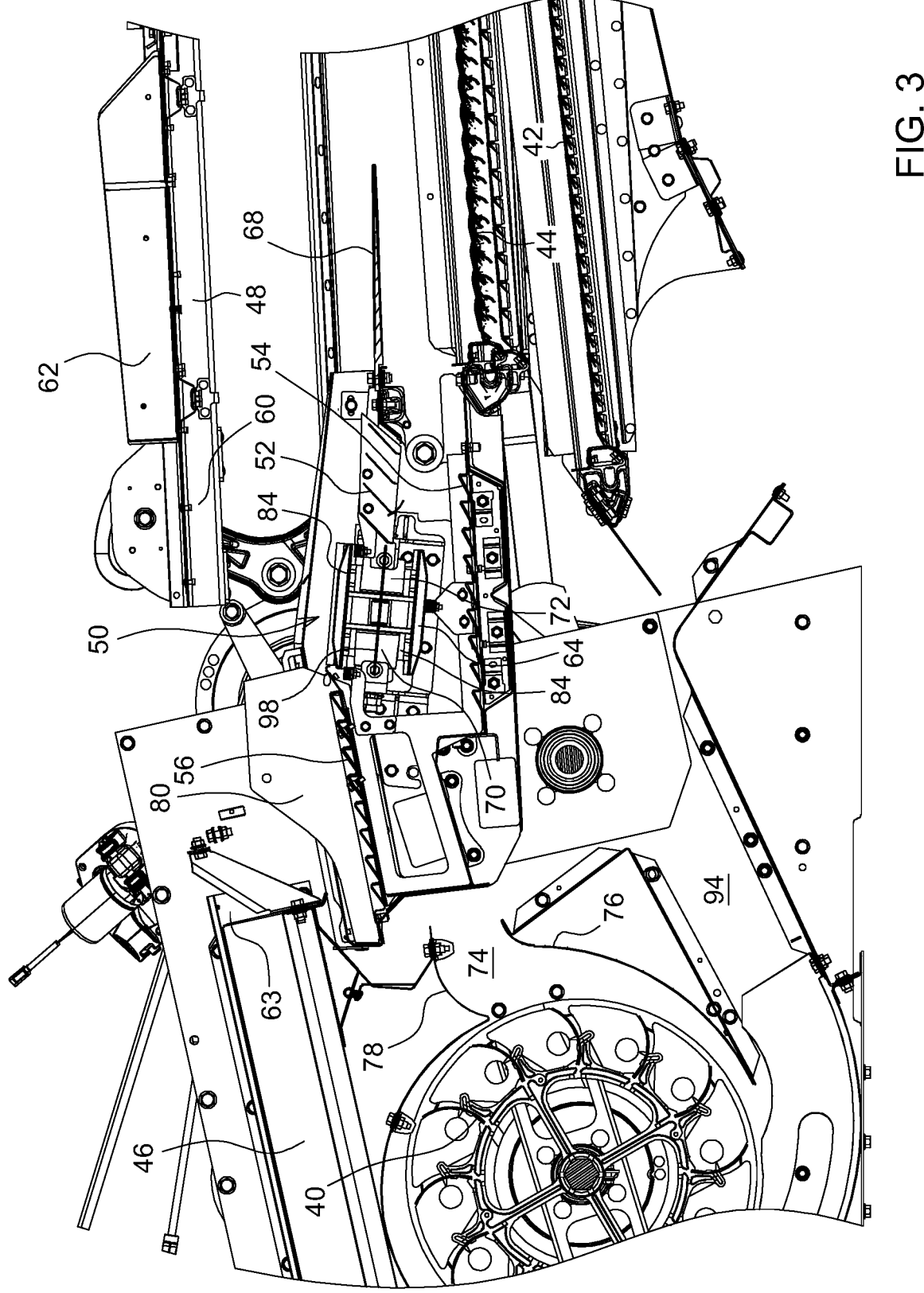
FIG. 3 shows a side view of the cleaning assembly.
Figure 4:
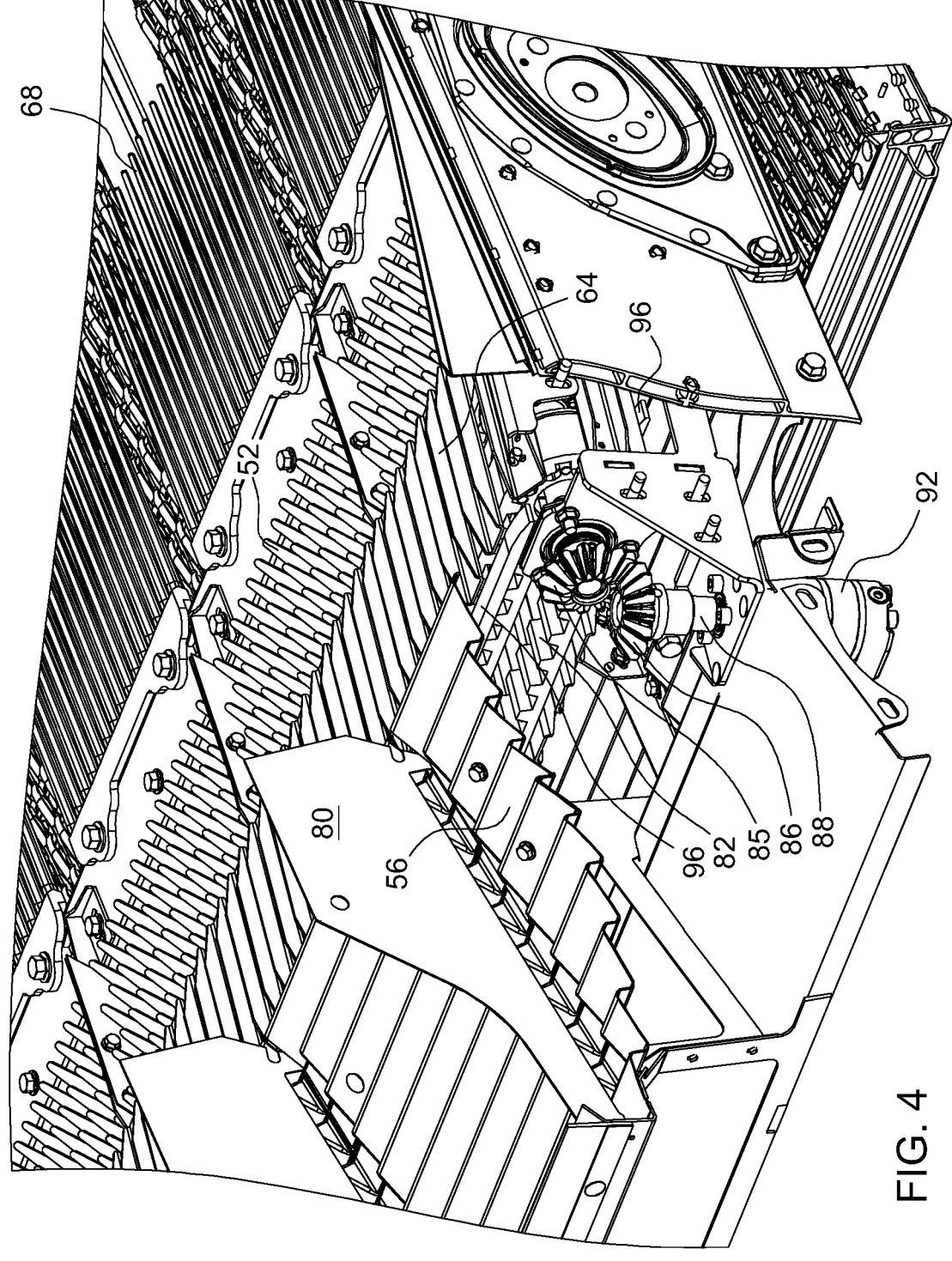
FIG. 4 shows an enlarged detail from FIG. 2.
Figure 5:
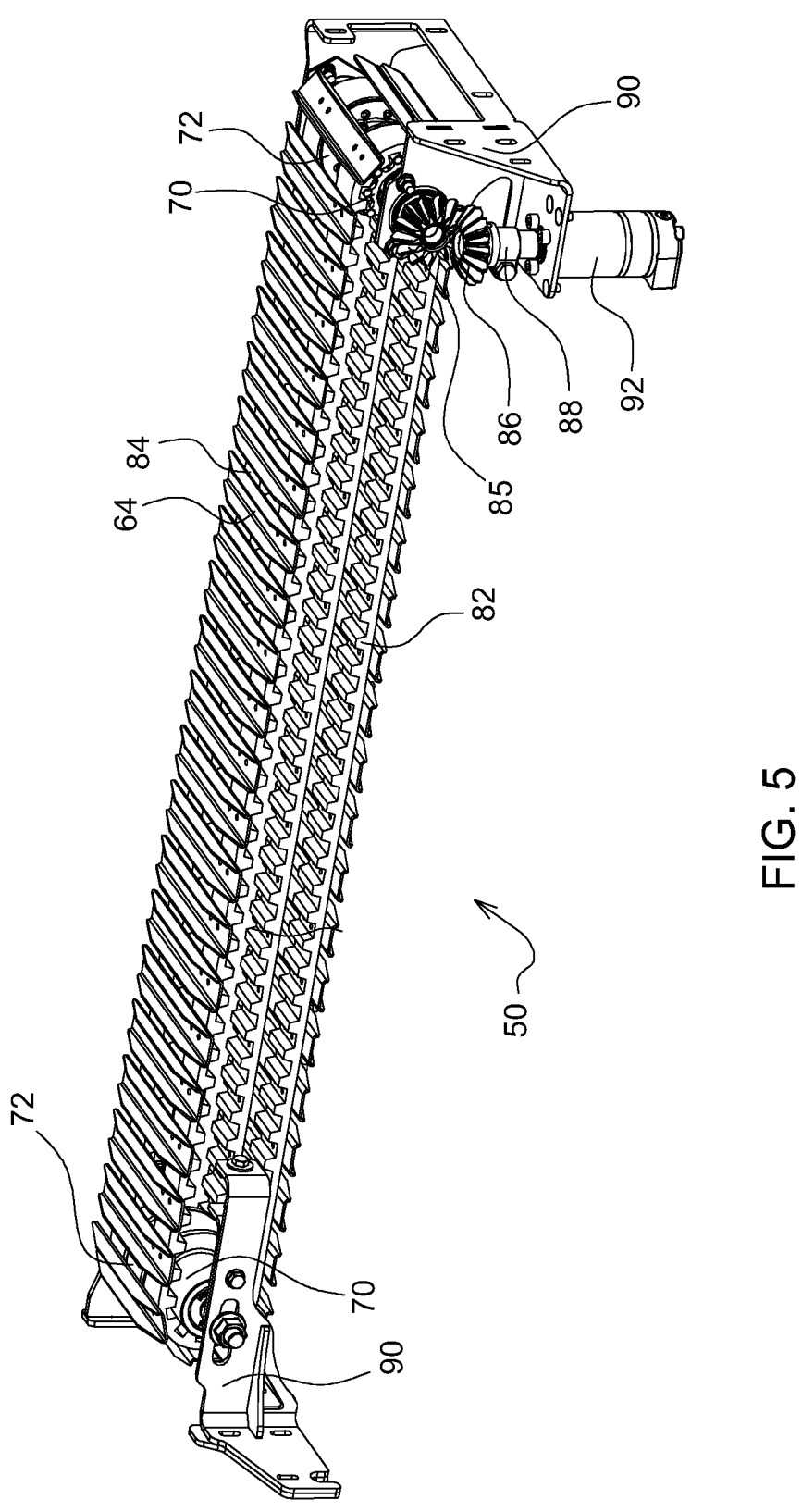
FIG. 5 shows a perspective view of the cross conveyor.

In order to prevent material from dropping through the upper strand onto the lower strand and being conveyed in the undesired direction, a planar separating element 98 could be fitted in the central plane of the cross conveyor 50, as is schematically shown in FIG. 3.

The open design of the cross conveyor 50 with endless traction means 84 ensures, as a result, that the air flow from the fan 40 can pass horizontally through the cross conveyor 50 as far as the slats 52 and the finger rakes 68. In addition, the cross conveyor 50 allows a certain separation of grain and contaminants and successive dispensing of the conveyed material across the width of the cleaning device 26

While exemplary implementations incorporating the principles of the present disclosure have been described herein, the present disclosure is not limited to such implementations. Consequently, this application is intended to cover any variations, uses, or adaptations of the disclosure using its general principles. Further, this application is intended to cover such departures from the present disclosure as come within known or customary practice in the art to which this disclosure pertains.

8

The invention claimed is:

1. A cleaning assembly for a combine harvester comprising:
   a conveyor for transporting at least one of or both of a threshed or separated mixture of grain and contaminants from at least one of or both of a threshing or separating device to an inlet of the cleaning assembly,
   screens for cleaning the mixture fed to the inlet of the cleaning assembly, which are able to be subjected to an action of an air flow by a fan, and
   a cross conveyor, arranged at the inlet of the cleaning assembly, for evening out a lateral distribution of the fed mixture,
   wherein the cross conveyor includes an open, air-permeable design, being arranged in the air flow provided by the fan
   wherein the cross conveyor includes an endless traction means having drivers distributed in a spaced-apart manner along a length of the traction means, wherein the traction means circulates about deflection wheels, and
   wherein the drivers have a U-shaped profile which is upwardly open when a respective driver to one of the plurality of traction means is located on an upper strand of the cross conveyor.

2. The cleaning assembly of claim 1, wherein the direction and speed of rotation of a drive of the cross conveyor is able to be predefined, on the basis of at least one of, some of, or all of: 1) a lateral inclination, sensed by a sensor, of the combine harvester; 2) a distribution, sensed by a sensor, of the material across the width of the cleaning assembly; or 3) an operator input via a suitable interface.

3. The cleaning assembly of claim 1, wherein the cross conveyor includes a plurality of successively arranged traction means and drivers that are connected to the plurality of traction means.

4. The cleaning assembly of claim 1, wherein the air flow flows against and through the cross conveyor substantially horizontally.

5. The cleaning assembly of claim 1, wherein drivers of at least one of or both of a lower or an upper strand of the cross conveyor are supported on support elements which extend in a lateral direction.

6. The cleaning assembly of claim 5, wherein a planar separating element is fitted in a central plane of the cross conveyor in order to prevent material from dropping through the upper strand of the cross conveyor onto the lower strand and being conveyed in an undesired direction.

7. A cleaning assembly for a combine harvester comprising:
   a conveyor for transporting at least one of or both of a threshed or separated mixture of grain and contaminants from at least one of or both of a threshing or separating device to an inlet of the cleaning assembly,
   screens for cleaning the mixture fed to the inlet of the cleaning assembly, which are able to be subjected to an action of an air flow by a fan, and
   a cross conveyor, arranged at the inlet of the cleaning assembly, for evening out a lateral distribution of the fed mixture,
   wherein the cross conveyor includes an open, air-permeable design, being arranged in the air flow provided by the fan,
   wherein the air flow flows against and through the cross conveyor substantially horizontally, and wherein a number of slats is arranged to a rear of the cross conveyor, which are able to be flowed through by the air flow that has previously flowed through the cross conveyor.

8. The cleaning assembly of claim 7, wherein a finger rake is arranged to a rear of the number of slats, which is able to be flowed through by the air flow that has previously flowed through the cross conveyor.

9. The cleaning assembly of claim 8, wherein a conveyor floor is mounted upstream of the cross conveyor, wherein the conveyor dispenses mixture from the threshing device onto the conveyor floor via a drop step.

10. The cleaning assembly of claim 9, wherein a further conveyor is arranged beneath the cross conveyor and the slats, the further conveyor conveying the material dropping onto the further conveyor toward the rear and dispensing the material onto a front region of a lower screen via a further drop step.

11. The cleaning assembly of claim 10, wherein a lower strand of the cross conveyor is arranged at a height above the further conveyor that is measured such that the lower strand does not appreciably convey material located on the further conveyor to a side.

12. The cleaning assembly of claim 10, wherein the cross conveyor is able to be set into a vibrating motion with at least one of: 1) the slats; 2) the finger rake; 3) the conveyor floor; or 4) a further conveyor floor.

13. The cleaning assembly of claim 7, wherein the cross conveyor includes an endless traction means having drivers distributed in a spaced-apart manner along a length of the traction means, wherein the traction means circulates about deflection wheels.

14. A combine harvester for harvesting crop, the combine harvester comprising:
    a threshing unit configured to thresh the crop; and
    a cleaning assembly configured to clean the threshed crop, wherein the cleaning assembly includes a conveyor for transporting at least one of or both of a threshed or separated mixture of grain and contaminants from at least one of or both of a threshing or separating device to an inlet of the cleaning assembly, screens for cleaning the mixture fed to the inlet of the cleaning assembly, which are able to be subjected to an action of an air flow by a fan, and a cross conveyor, arranged at the inlet of the cleaning assembly, for evening out a lateral distribution of the fed mixture, wherein the cross conveyor includes an open, air-permeable design, being arranged in the air flow provided by the fan,
    wherein the cross conveyor includes an endless traction means having drivers distributed in a spaced-apart manner along a length of the traction means, wherein the traction means circulates about deflection wheels, and
    wherein the drivers have a U-shaped profile which is upwardly open when a respective driver to one of the plurality of traction means is located on an upper strand of the cross conveyor.

15. The combine harvester of claim 14, wherein the air flow flows against and through the cross conveyor substantially horizontally and a number of slats are arranged to a rear of the cross conveyor, which are able to be flowed through by the air flow that has previously flowed through the cross conveyor.

16. The combine harvester of claim 14, wherein a number of slats is arranged to a rear of the cross conveyor, which are able to be flowed through by the air flow that has previously flowed through the cross conveyor.

17. The combine harvester of claim 14, wherein the cross conveyor includes a plurality of successively arranged traction means and drivers that are connected to the plurality of traction means.

18. The combine harvester of claim 16, wherein a further conveyor is arranged beneath the cross conveyor and the slats, the further conveyor conveying the material dropping onto the further conveyor toward the rear and dispensing the material onto a front region of a lower screen via a further drop step.

19. The combine harvester of claim 14, wherein drivers of at least one of or both of a lower or an upper strand of the cross conveyor are supported on support elements which extend in a lateral direction.

20. The combine harvester of claim 16, wherein a finger rake is arranged to a rear of the number of slats, which is able to be flowed through by the air flow that has previously flowed through the cross conveyor.

* * * * *